United States Patent Office 3,220,924
Patented Nov. 30, 1965

3,220,924
PROCESS FOR THE PREPARATION OF TROPIC-STABLE SUPPOSITORY MASSES AND THE PRODUCT THEREOF
Rudolf Tuma, Witten (Ruhr), Germany, assignor to Chemische Werke Witten G.m.b.H., Witten (Ruhr), Germany
No Drawing. Filed June 14, 1963, Ser. No. 287,759
Claims priority, application Germany, June 22, 1962, C 27,297
5 Claims. (Cl. 167—64)

The present invention relates to the preparation of tropic-stable suppository masses having a desired melting point whereby the term "tropic-stable suppository masses" is intended to define those masses which, with regard to shipping, storage, and usability thereof, are capable of withstanding the temperatures and humidities to be expected in tropical countries, and which have a melting point of over 40° C.

It is known to prepare suppository masses from natural fats by cleaving—as starting materials—fats of the coconut and palm-kernel group, fractionally distilling of the resulting fatty acids, hydrating the unsaturated fatty acids, and esterifying the remaining fraction having from 10 to 18 carbon atoms with glycerin or other polyhydric alcohols in such a manner that partial esters with free hydroxyl groups are formed. Such suppository masses, however, have a melting point of less than 40° C., generally between 30 and 37° C.

There is a great interval of temperature between the melting point and the solidification point of the esterification products described hereinabove so that these suppository masses will, in warmer zones, pass over into the liquid condition very rapidly due to the high ambient temperatures of the climate. Hence, the suppositories made therefrom decompose during storage.

It is also known to employ, as suppository bases, natural wax esters of monoacid fatty acids with monohydric alcohols, either alone or in mixtures. The suppositories made from such masses are, however, unsuitable as tropic-resistant suppositories since they become smeary or brittle. Moreover, subsequent hardening phenomena arise during storage thereof.

It has now been found that tropic-stable suppository masses which meet the requirements of the pharmaceutical industry with regard to the manufacture of suppositories under tropical climatic conditions may be prepared when (1) fatty acid triglycerides of saturated fatty acids having from 10 to 18 carbon atoms, a melting point of between approximately 38 and 40° C. and a hydroxyl number of between approximately 40 and 100, preferably 50, and (2) wax esters prepared from saturated fatty acids having from 12 to 16 carbon atoms and monohydric saturated aliphatic alcohols having from 14 to 16 carbon atoms, and having a melting point of between approximately 40 and 47° C. and a hydroxyl number of between approximately 10 and 30, preferably 15, are transesterified or interesterified in the presence of sodium or potassium methylate in such a ratio, preferably 50:50, that uniform suppository masses are obtained having a melting point of above 40° C. and a solidification point of the same value.

The suitability of the products made according to the present invention as tropic-stable suppository masses is surprising since the starting materials used in the preparation of the suppository masses according to the present invention do not reveal such suitability by themselves. The products obtained according to the present invention are homogeneous, well adapted to being poured, elastic, and have a solid texture.

In view of the fact that medicinal substances of the most diversified nature may be added to the suppository masses, such as, for example, substances that are soluble in fat, water-soluble and dry substances, volatile oils, balsam, etc., it may be advantageous to admix with the suppository mass according to the present invention a complex emulsifier such as a polyethylene oxide fatty acid triglyceride in order to increase the emulsifying capacity of such suppository masses. The emulsifier is suitably added in amounts of between 1 to 5% by weight, preferably 2% by weight, referred to the quantity of the starting material employed. As complex emulsifiers, polyhydroxyethylated castor oil may, for example, be used.

The preparation of the suppository masses in accordance with the present invention may be carried out, for example, in such a manner that triglycerides of saturated fatty acids having 10 to 18 carbon atoms and a hydroxyl number of between approximately 40 and 100, preferably around 50, are made according to processes known in the art. Wax esters from mixtures of saturated fatty acids having from 12 to 16 carbon atoms and monohydric saturated aliphatic alcohols having from 14 to 16 carbon atoms are separately so synthesized in a manner known in the art that there still remains a hydroxyl number of between approximately 10 and 30, preferably 15. The above-named esterification products are mixed at a ratio of approximately 50:50 and transesterified in the presence of 0.15% by weight of potassium methylate at 120° C. The catalyst is subsequently removed in a conventional manner and 2% by weight of polyhydroxyethylated castor oil is stirred into the thus obtained esterification product at 50° C.

Accordingly, the primary object of the present invention is a process for the production of tropic-stable suppository masses.

Other objects of the present invention will become apparent from the following description, wherein the examples serve to illustrate the invention without, however, limiting the same.

*Example I*

3 kg. of fatty acids with $C_{10}$ to $C_{18}$ carbon atoms having an acid number of 243 and a composition of $C_{10}$:1%; $C_{12}$:38.5%; $C_{14}$:23%; $C_{16}$:17%; $C_{18}$:20.5%, are esterified with 514 g. of glycerin (99% by weight) in the presence of 5 g. of zinc dust in vacuo at 20 Torr and a temperature of 220° C. within a time interval of 7 hours. The zinc soaps formed are subsequently rinsed with 350 g. of a 10% solution of sulfuric acid, neutrally washed with water and refined with soda lye, and thereupon bleached with 60 g. of bleaching earth (fuller's earth) carbon. After filtration of the bleaching earth/carbon mixture, the product is deodorized with overheated water vapor at 220° C. for about 2 hours. The characterizing numbers of the esterification product are as follows:

Rising melting point, ° C. _____ 38 to 38.5
Acid number _____ 0.5
Saponification number _____ 224
Iodine number _____ 2
Hydroxyl number _____ 48

2,000 g. of myristic acid (acid number 248) and 2,160 g. of $C_{16}$-alcohol are separately esterified within 6 hours at 210° C. and 20 Torr. The esterification product has the following characterizing numbers:

Rising melting point, ° C. _____ 45.5 to 46.0
Acid number _____ 0.6
Hydroxyl number _____ 12
Iodine number _____ 1

From the resulting esterification products, 1,000 g. of each are mixed in a glass vessel with reflux and transesterified in the presence of 3 g. of potassium methylate at 120° C. and 10 Torr for ½ hour. After inactivation of the catalyst with water and drying of the esterification product, 40 g. of polyhydroxyethylated castor oil are added thereto. The esterification product has the following characterizing numbers:

Rising melting point, ° C. _____ 41.8 to 42.1
Solidification point, ° C. _____ 41.5
Acid number _____ 0.4
Saponification number _____ 171
Hydroxyl number _____ 18

*Example II*

3 kg. of fatty acids having from 12 to 18 carbon atoms,

Acid number of the fatty acids _____ 237.8
Composition of the fatty acids:
    $C_{12}$ _____percent__ 35.0
    $C_{14}$ _____do____ 15.7
    $C_{16}$ _____do____ 20.0
    $C_{18}$ _____do____ 29.3 are esterified with 508 g. of glycerin in the presence of 5 g. of zinc dust, as described in Example I. The further treatment is carried out precisely as in Example I.

The characterizing numbers of the esterification product are as follows:

Rising melting point, ° C. _____ 43.5–44
Acid number _____ 0.2
Saponification number _____ 222
Iodine number _____ 1
Hydroxyl number _____ 42

2,100 g. of myristic acid, having the acid number 248.5, and 1,990 g. of $C_{14}$-alcohol are separately esterified within 6 hours at 270° C. and 20 Torr. The esterification product has the following characterizing numbers:

Rising melting point, ° C. _____ 39.1–39.5
Acid number _____ 0.3
Hydroxyl number _____ 10
Iodine number _____ 1

The transesterification is made in the same manner as in Example I. After drying, 80 g. of polyhydroxyethylated castor oil are added to this esterification product. The esterification product has the following characterizing numbers:

Acid number _____ 0.3
Saponification number _____ 172
Hydroxyl number _____ 22
Melting point, ° C. _____ 40.3–40.6
Solidification point, ° C. _____ 40

While the invention has been described with reference to the two examples thereof, it will be understood that changes may be made in carrying out the processes without departing from the scope of the invention, and it is intended that all matter contained in the above description shall be interpreted as illustrative and not in a limiting sense.

I claim:

1. A process for the preparation of tropic-stable suppository masses which comprises reacting a triglyceride of a fatty acid selected from the group consisting of saturated fatty acids having from 10 to 18 carbon atoms, said glyceride having a melting point of between approximately 38° and 40° C. and a hydroxyl number of between approximately 40 and 100, with a wax ester selected from the group consisting of the wax esters of saturated fatty acids having from 12 to 16 carbon atoms and monohydric saturated aliphatic alcohols having from 14 to 16 carbon atoms, said wax ester having a melting point of between approximately 40° and 47° C. and a hydroxyl number of between approximately 10 and 30, in the presence of a catalyst selected from the group consisting of sodium methylate and potassium methylate under transesterification reaction conditions effective to give a reaction product having a melting point of at least 40° C.

2. The process of claim 1, wherein an emulsifier is admixed with said reaction product in amounts of from about 1 to 5% by weight.

3. A tropic-stable suppository mass produced by the process of claim 1.

4. A tropic-stable suppository mass produced by the process of claim 1, additionally comprising an emulsifier in amounts of from about 1 to 5% by weight.

5. A process for the preparation of tropic-stable suppository masses which comprises reacting approximately equal proportions of a triglyceride of a fatty acid selected from the group consisting of saturated fatty acids having from 10 to 18 carbon atoms, said glyceride having a melting point of between approximately 38° and 40° C. and a hydroxyl number of between approximately 40 and 100, with a wax ester selected from the group consisting of the wax esters of saturated fatty acids having from 12 to 16 carbon atoms and monohydric saturated aliphatic alcohols having from 14 to 16 carbon atoms, said wax ester having a melting point of between approximately 40° and 47° C. and a hydroxyl number of between approximately 10 and 30, in the presence of about 0.15% by weight of a catalyst selected from the group consisting of sodium methylate and potassium methylate at about 120° C. to give a transesterification reaction product having a melting point of at least 40° C.

References Cited by the Examiner

UNITED STATES PATENTS 2,993,063   7/1961   Alsop et al. _____ 167—64

FOREIGN PATENTS 1,090,824   10/1960   Germany.
843,886   8/1960   Great Britain.

OTHER REFERENCES

Annales Pharmaceutiques Francaises, vol. 18, pages 258–260, April 1960.

Robertson, Journal of Pharmaceutical Sciences, vol. 50, No. 1, pages 21–23, January 1961.

LEWIS GOTTS, *Primary Examiner.*

FRANK CACCIAPAGLIA, JR., *Examiner.*